United States Patent Office 3,409,575
Patented Nov. 5, 1968

3,409,575
POLYMERIZATION PROCESS, POLYMERS PRODUCED AND XEROGRAPHIC MEMBERS THEREFROM
Albert J. Cole, New Hanover Township, and Floyd L. Edris, Pottstown, Pa., assignors to The Firestone Tire and Rubber Company, Akron, Ohio, a corporation of Ohio
No Drawing. Filed Dec. 11, 1963, Ser. No. 329,895
8 Claims. (Cl. 260—27)

ABSTRACT OF THE DISCLOSURE

The homopolymers and copolymers of vinyl chloride have been art recognized to have a number of advantageous properties. Butadiene-styrene interpolymers have been recognized as having still different desirable properties. Many attempts have been made to blend the two types of polymers in order to obtain the best characteristics of each polymer in a single resin mass. Unfortunately, the polymers are quite incompatible and the blends have been found to be essentially useless. It has now been found, however, that vinyl chloride/butadiene-styrene graft copolymers can be prepared in which the vinyl chloride polymer is the polymeric substrate of the graft. The method for making the graft polymer and the desirable properties of the polymer are disclosed. A number of uses for the polymer, including the production of coated papers and xerographic binder plates, are also discussed.

---

This invention relates to a polymerization process, polymers produced thereby and xerographic members comprising said polymers. In particular, the invention relates to vinyl chloride/butadiene-styrene graft copolymers, latices thereof, methods of preparing said latices, articles coated with the copolymers, and xerographic binder plates made with the copolymers.

Homopolymers and copolymers of vinyl chloride are well known to the art. It is also known to prepare latices of these polymers. Similarly, butadiene-styrene copolymers and latices thereof are known. Attempts to prepare blends of such latices or of the polymers in order to combine the advantageous properties of individual polymers, have been unsuccessful. The polymers, per se, are incompatible. If latices of the individual polymers are mixed a white cloudy powder precipitates. The powder cannot be satisfactorily worked. Attempts to mill this powder, similarly as attempts to mill together blends of the dry polymers, result in course granular masses that have no utility.

Since the discovery of xerography by Carlson, a number of xerographic plates have been developed. One of the most significant of the advances in xerographic plate manufacture was the discovery of the "binder plate" by A. E. Middleton. A general description of these plates and their method of manufacture is given by Middleton in U.S. 2,663,636. In the binder plate the photoconductive insulating layer comprises a finely divided photoconductive material dispersed in an electrically insulating resinous binder, whence the term "binder plate." Binder plates can be made by dissolving the resin in an organic solvent, dispersing the finely divided photoconductor in the solution and then coating the suspension on the desired substrate. A wide variety of photoconductive compounds are useful in preparing binder plates. A broad list of such materials is given, for example, in the Middleton patent, supra, and in U.S. Patent 2,862,815 to Sugarman et al. Particularly preferred photoconductors for use in preparing binder plates are the sulfides and selenides of zinc and cadmium.

Because of their low cost and wide availability, zinc oxide and tetragonal lead monoxide have been particularly interesting materials for use in binder plates. At present the most widely used binder plate is made by coating an organic solvent solution of a resin containing zinc oxide as the photoconductor unto a paper backing. As zinc oxide is a common paper coating pigment, such a structure would appear potentially to be no more expensive than ordinary magazine paper. To date, however, this potential has not been realized. Thus the necessity of using organic solvents adds considerably to the cost of the finished paper, due, in part, to the necessity for special apparatus for solvent recovery and to minimize vapors and fumes. Attempts have been made to eliminate the organic solvent and apply the coating in an aqueous system. Such attempts have either resulted in films having drastically diminished electrical insulating properties and increased sensitivity to moisture or require special handling as by a preliminary heat treatment prior to use.

In addition to the cost imposed by the use of solvent coating, the exacting xerographic requirements placed on the binder plate have necessitated the use of premium-price resins. Thus, while many inexpensive resins are known as having excellent electrical resistance, it has been found that resins such as silicones and certain acrylic resins are far superior to conventional resins such as butadiene-styrene copolymers in the xerographic properties of binder plates prepared therefrom.

Accordingly, it is an object of this invention to provide new and improved coatings and coating compositions based on vinyl chloride resins.

Another object is to provide such coating compositions in the form of aqueous dispersions or latices.

A further object is to provide coatings which will combine clarity and cohesiveness on the one hand, together with a high degree of hardness and toughness on the other hand.

There is also an object to provide methods for preparing such latex coating compositions.

Yet another object is to provide articles comprising a substrate coated with a tightly adhering, continuous layer of such coatings.

A still further object is to provide new and improved xerographic binder plates comprised of such coatings.

Many other objects and the numerous advantages of the invention will be apparent from the following more detailed description.

The above and other objects are secured, in accordance with this invention, in latices of vinyl chloride resins upon which have been graft copolymerized mixtures of butadiene and styrene. In a latex according to this invention, the ratio of the weight of the substrate vinyl chloride resin to that of the mixture of butadiene and styrene should be from about 1.0 to about 2.33, preferably about 1.85; and the ratio of the weight of butadiene to the weight of styrene in the mixture of grafted monomers should be from about 0.25 to about 4.0, preferably about 1.0.

It has been found that binder plates having excellent xerographic properties may be prepared using any of the conventional photoconductive pigments suspended in the novel aqueous latices of this invention. The resulting aqueous coating system may be handled in conventional paper machinery to apply the coating to a paper web, using conventional techniques for handling aqueous coating compositions.

Generally, the vinyl chloride polymer of the substrate is a vinyl chloride homopolymer, but up to 20 percent of co-monomers, based on the weight of the final resultant vinyl chloride copolymer, may be used in producing the vinyl chloride resin of the substrate. Monomers which are suitable for producing copolymers with vinyl chloride are well known and include, for instance, vinylidene chloride, vinyl acetate, vinyl stearate, styrene, acrylic and methacrylic esters such as methyl methacrylate, ethyl methacrylate, propyl methacrylate, butyl methacrylate, octyl methacrylate, dodecyl methacrylate and the like; methyl acrylate, ethyl acrylate, propyl acrylate, butyl acrylate, octyl acrylate, dodecyl acrylate and the like; alkyl fumarates, alkyl maleates and the like; acrylonitrile, vinyl-type ethers and ketones such as methyl vinyl ether, methyl vinyl ketone and related compounds such as methyl isopropenyl ketone and the like. A more complete listing of suitable comonomers useful for polymerizing with vinyl chloride to produce latices useful in the practice of this invention is found in Krezil "Kurzes Handbuch der Polymerisationstechnik—II Mehrstoff - Polymerisation," Edwards Bros. Inc., 1945, pp. 735–37, the items under "Vinyl chlorid."

The substrate is most preferably prepared in the form of a low surfactant, high solids latex as described in the copending application of R. C. De Wald entitled, "Polyvinyl Chloride Latex and Process Therefor" filed on even date herewith. The entire disclosure of the De Wald application is incorporated herein by reference thereto.

In general, De Wald describes a process for emulsion polymerization of a monomer material selected from the group consisting of vinyl chloride and mixtures thereof with up to about 20 percent by weight, based on the total weight, of other ethylenically unsaturated monomers copolymerizable therewith by polymerizing said material at a temperature of from about 0° to about 100° centigrade in water containing a free-radical polymerization catalyst and a surfactant. The surfactant consists essentially of a mixture of (A) fatty acid salt and (B) salt of a member of the group consisting of alkyl sulfates, alkyl aryl sulfonates and mixtures thereof. The alkyl groups of each of said salts (A) and (B) contain from 8 to 18 carbon atoms. Each of said salts (A) and (B) is selected from the group consisting of alkali metal, ammonium and water-soluble amine salts. The total weight of the surfactant mixture, calculated on the basis of the weight of the fatty acid from which the fatty acid salt is derived and the weight of the salt (B), is within the range of from about 0.5 percent to about 2.0 percent by weight of the monomeric material and the respective proportions of the fatty acid and the salt (B) are sufficient to maintain a stable emulsion of the polymerization product. The water constitutes no more than about 60 percent by weight of the polymerization mixture so that there is produced a stable latex containing at least about 40 percent by weight of polymerized product at a total surfactant weight not more than about 2.0 percent.

The polymerization of the substrate can be effected by using a suitable water soluble free-radical catalyst such as a peroxy polymerization catalyst. Suitable catalysts include hydrogen peroxide, sodium or potassium persulfate, percarbonate, peracetate, perborate and the like. Other suitable catalysts include cumene hydroperoxide, t-butyl hydroperoxide, acetone peroxide, etc. The catalyst may be used alone or in association with activating systems such as redox systems involving versivalent metals and mild reducing agents, for example, a potassium persulfate-sodium bisulfite or an ammoniacal copper ion-carbon tetrachloride-sodium bisulfite system. The amount of catalyst added will vary over a wide range but in most cases will be from about 0.01 to about 3 percent by weight of monomer material and preferably from about 0.1 to about 2 percent by weight.

The combination of emulsifiers whose synergistic effect makes possible the preparation of such a high solids latex is a combination of a fatty acid soap and an alkyl sulfate salt or an alkyl aryl sulfonate salt. The alkyl group of the alkyl sulfate salt or the alkyl aryl sulfonate salt contains from 8 to 18 carbon atoms and preferably from 10 to 14 carbon atoms. The alkyl sulfates or alkyl aryl sulfonates are used in the form of their salts such as an alkali metal, ammonium or water-soluble amine salts. The preferred salts are the potassium, sodium, ammonium and water-soluble alkanolamine salts. The preferred water-soluble alkanolamine salt is the diethanolamine salt. A mixture of alkyl sulfates may be used, such as is obtained from the sulfate salt of the alcohol mixture prepared by hydrogenating coconut oil. In addition mixtures of alkyl aryl sulfonates, or mixtures of the aforementioned sulfates and sulfonates may be used.

The soaps used in combination with the alkyl sulfate salts or alkyl aryl sulfonate salts are the water-soluble salts of alkyl fatty acids having from 8 to 18 atoms. It is preferred that the soap contain from 8 to 12 carbon atoms and most preferred are capric and lauric acid salts. The fatty acid salts used are the alkali metal, ammonium and water-soluble amine salts of such fatty acids. The preferred salts are the potassium, sodium, ammonium and water-soluble alkanolamine salts. The preferred water-soluble alkanolamine salt is the diethanolamine salt. Mixtures of fatty acids may be used in preparing the soaps. In any event, the soap may be added as such or the free fatty acid and the desired alkali or mixture of alkalies added separately in the polymerization recipe to form the soap in situ. When forming the soap in situ, the alkalies should be present in an amount at least slightly in excess of the stoichiometric amount.

In accordance with the present invention latices prepared as described above and in the De Wald application are mixed with butadiene and styrene in amounts such that the ratio of the weight of vinyl chloride polymer or copolymer in the latex to that of the added mixture is from about 1.0 to about 2.33, preferably about 1.85. The total amount of the mixture added should be such that the ratio of the weight of butadiene to the weight of styrene therein is from about 0.25 to about 4.0, preferably about 1.0. It is desirable to continue the polymerization without addition of any further catalyst. In the particular polyvinyl chloride-butadiene/styrene system involved in the present invention, further addition of catalyst is unnecessary to produce polymerization of the added monomers and introduces a tendency towards precoagulation of the latex and impairment of the heat- and light-aging properties, and electrical characteristics of the resin. In addition, there is evidence that the character of the polymerization is different when no catalyst is added; it is surmised that, when no catalyst is added, no fresh growing chains of polymer are created, so that further polymerization takes place by way of continued lengthwise growth of the established polymeric chains, rather than by way of lateral attachment of side chains. At any rate, the general performance of the latex and the resulting coatings is improved when the grafting operation is carried out without the addition of supplemental catalyst. Also, it is desirable that there be added a mercaptide-type chain-transfer agent to the reaction mixture during the grafting reaction in order to regulate the hardness of the final product. The grafting is effected by adjusting the temperature to the polymerization range (if it is not already in that range) i.e., 40°–100° centigrade in the case of unactivated, and 0°–100° centigrade in the case of activated systems. When the required amount of the grafted monomers has reacted, any excess monomers are blown off. The resultant latex is then ready for use in coating or other applications.

For the purposes of the present invention, it is also important to add to the reaction mixture from about 1 to about 10 (preferably about 5) percent by weight, based on the weight of the graft copolymer produced of a stabilizing agent so that final latex will have good mechanical stability. Suitable stabilizers include shellac or further amounts of fatty acid soaps or of the alkyl sulfate or alkyl aryl sulfonate used in the preparation of the substrate latex. Preferably, the stabilizing agent is shellac.

Any commercial grade of shellac may be used. Some grades such as orange shellac produce color and/or cloudiness in the polymer. The physical properties of latexes produced with such shellacs are satisfactory, but because of the color their use is generally restricted to applications where this is not critical. It is preferred to use a refined shellac, i.e., a shellac which has been both bleached and dewaxed. In addition to natural shellac, any other natural or synthetic polymer which is alkali soluble and is used by the art as a chemical equivalent of shellac may be substituted for natural shellac in whole or in part in the instant invention. Shellac is added by dissolving the shellac or other alkali-soluble shellac-type polymer in water using ammonia or borax as the solubilizing agent and adjusting the pH of the solution to from about 6.5 to about 8.3.

The primary use of the graft copolymers of this invention is for the formation of hard, coherent, smooth and clear coatings on a variety of surfaces, such as linoleum; asphalt, vinyl and other composition floor tiles; wood; asbestos board; masonry products such as concrete, brick or plaster; composition building board; and in the impregnation of porous materials such as paper, felt, etc. The coatings are applied by dipping, spraying, brushing, flow-coating, roller coating or similar processes, using the liquid latices produced as described above. The coatings are then dried in air or other gaseous medium at temperatures on the order of 4–90° centigrade. The resultant films are hard, tough, coherent, and impervious, and adhere very well to the surfaces to which they are applied.

The latices of this invention are especially useful for preparation of xerographic binder plates.

As stated, any of the conventional photoconductive pigments may be used in formulating binder plates with the aqueous latices described herein. Such pigments include, without limitation, those set forth by Sugarman et al. in U.S. Patent 2,862,815 and include, for example, the colored oxides, sulphides, tellurides and iodides of cadmium, mercury, antimony, bismuth, thallium, indium, molybdenum, aluminum, lead and zinc. In addition, arsenic trisulphide, cadmium arsenide, lead chromate and selenium may be used. Particularly preferred as the photoconductive pigment are zinc oxide, tetragonal lead monoxide, the sulfides and selenides of zinc and cadmium, and mixtures of zinc oxide and red mercuric sulfide. The pigment is first dispersed in water using a dispersing aid such as potassium tripolyphosphate, an anionic surfactant, etc. The pigment dispersion is then blended with the latex in the desired ratio, the solids content adjusted, and the coating mixture applied to the substrate using conventional coating equipment as an air knife, roller, dip blade, etc. The use of moderate amounts of dispersing aid to disperse the pigment has no adverse effect on the xerographic properties of the films. If desired, a photographic sensitizing dye may also be added to the coating to improve the light sensitivity of the coating. The use of such dyes is set forth, for example, in U.S. Patent 3,051,569 to Sugarman et al. and in U.S. Patent 3,052,540 to Greig. The ratio of pigment to binder in the coating mixture is not critical. The ratios normally used in the art range from about 1 to about 10 parts of pigment, by weight, to one part of binder. The precise ratio used will vary according to the end use and other considerations of the formulator. In general, a ratio of from about 1.5 to about 5 parts of pigment to one part of binder is preferred.

The economies made possible by the use of the aqueous coating mixtures of the invention are most clearly realized when the coating is applied to a paper web. Accordingly, this constitutes a preferred embodiment of the invention. However, the invention is not limited thereto and the coating composition may be applied to any type of substrate conventional in the xerographic art. It is preferred (but not required for the purposes of this invention) that the substrate be electrically conductive or semi-conductive as for example, paper, metal, electrically-conductive plastic, or glass coated with an electrically conductive layer. The substrate may be flexible or rigid and may have any desired geometric configuration. If desired, the coating may also be applied to a completely insulating substrate in which case a special charging device must be utilized to supply an artificial ground plane as is necessary in xerographic processes. Such a device, termed a double corona, is described, for example, in U.S. Patent 2,922,883. Where paper is used as the substrate, the paper itself may be first coated with a subbing layer or may be otherwise treated as by addition of hygroscopic salts, carbon black, metallic powders, etc., to impart a higher degree of electrical conductivity to the paper web. Wet strength resins, dyes and other additives normally added in the papermaking process may be used without detracting from the ability of the web to serve as the substrate in the instant invention.

The layer obtained by application of the coating mixture to the substrate may be any desired thickened as is conventional in the art. Generally, a thickness in the range of from about 10 to 500 microns has been found satisfactory. Desirably, the coating is heated for a few minutes. It is believed that the heating completes the drying operation and improves the bond of the pigment and binder. The binder plate produced according to the instant invention has a photoconductive insulating layer comprising a photoconductive pigment, dispersed in a polyvinyl chloride-styrene/butadiene graft copolymer binder. The layer is firmly bonded to the substrate and has excellent flexibility, bonding strength and toughness. Further the layer has excellent xerographic properties. Electrostatic images developed on the photoconductive insulating layers of the invention are at least as good as products made employing the conventional organic solvent coating techniques and using premium (and expensive) resin binders.

The invention will be further understood after referring to the following illustrative specific examples.

EXAMPLE 1

The substrate latex was prepared from the following materials:

| | | |
|---|---|---|
| Vinyl chloride | grams | 65 |
| Water | do | 65 |
| Potassium persulfate | gram | 0.1 |
| Ammonium hydroxide (28 percent) | cc | 0.5 |
| Sodium lauryl sulfate (90 percent) | gram | 0.1 |
| Capric acid | do | 0.5 |

A reactor having a rotary stirrer and a heating and cooling jacket was provided for the preparation of the latex. The ingredients listed above, with the exception of the vinyl chloride, were charged at 25° centigrade and the stirrer set in motion to dissolve the ingredients. The air in the reactor was evacuated and purged with vinyl chloride vapor. The vinyl chloride of the recipe was then pressured in, the temperature raised to 45° centigrade and minimum agitation continued throughout the reaction to follow. These conditions were maintained for a total of 16 hours at the end of which time the unreacted vinyl chloride was vented.

The grafted material comprised the following ingredients:

| | Grams |
|---|---|
| Butadiene | 17.5 |
| Styrene | 17.5 |
| Dodecyl mercaptan | 0.012 |
| Shellac | 5.0 |
| Water | 65.0 |

The shellac was first dissolved in the water using ammonium hydroxide as a shellac solubilizing agent and the water was added to the substrate latex. The mercaptan and styrene and butadiene monomers were then added. The vessel was purged of air and sealed. Further polymerization was conducted at 65° centigrade for 16–20 hours with moderate agitation (a Pfaulder intensity of about 2.0).

The resulting latex was suitable for coating immediately following venting and mild stripping. The addition of shellac to the grafting mixture gave a copolymer latex having excellent mechanical stability, capable of withstanding thirty minutes or more in a shaking apparatus without flocculation. In comparison, an identical latex without the shellac could withstand only about 7 minutes before flocculation occurred.

The latex was excellently suited for use as an electrostatic paper coating because of its ability to accept and retain a static electric charge. A coating made from this latex, after drying, does not block at temperatures up to 70° centigrade and at pressures of 1 pound per square inch. It had a slight sheen, was clear, colorless and coherent and did not discolor at temperatures up to 150° centigrade.

To establish the utility of the latex in preparing direct image electrostatic paper, coatings of varying thickness were laid down on commercially available paper known as Offset Enamel (O/E) paper, using commercial air knife paper coating equipment. The coatings were dried at temperatures varying from room temperature up to about 148° centigrade and then conditioned at varying relative humidities for various times prior to testing.

In testing an electrostatic charge was imposed on the conditioned coating using a conventional corona discharge device operating at about minus 6500 volts. The paper backing was grounded during the charging step by contact with a grounded sheet of metal. The amount of charge accepted by the coating and the amount of charge retained after two minutes were each determined with a previously calibrated commercially available electrometer.

Direct image reproduction was accomplished by imposing a voltage through a needle point or plurality of needle points onto the coated paper. Substantially immediately after charging the coating the latent image thus produced was developed in the conventional manner by cascading a xerographic developer over the latent image.

Results of the tests are shown in Tables I through IV below. Tables I through III indicate the effect of various conditioning upon the ability of the coating to accept and retain an electrostatic charge. Table IV indicates the effect of various coating thicknesses. In each Table $V_1$ represents the accepted charge and $V_2$ represents the charge retained after a two minute interval.

TABLE I

Coating Thickness: 8 to 10 pounds per ream.
Conditioning: 40 to 50 percent Relative Humidity, 70 to 75° Fahrenheit for 96 Hours

| Drying Temperature (° Centigrade) | $V_1$ | $V_2$ | Percent Retained | Print Quality |
|---|---|---|---|---|
| 23 | 800 | 310 | 39 | Excellent. |
| 60 | 850 | 300 | 35 | Do. |
| 75 | 950 | 375 | 40 | Do. |
| 100 | 1,350 | 760 | 56 | Do. |
| 125 | 1,300 | 750 | 57 | Do. |
| 148 | 1,350 | 700 | 52 | Do. |

TABLE II

Coating Thickness: 8 pounds per ream.
Conditioning: 75 percent Relative Humidity, 74° Fahrenheit, 48 Hours

| Drying Temperature (° Centigrade) | $V_1$ | $V_2$ | Percent Retained | Print Quality |
|---|---|---|---|---|
| Room Temperature | 400 | 120 | 30 | Fair. |
| 60 | 400 | 150 | 38 | Do. |
| 75 | 425 | 200 | 47 | Very good. |
| 100 | 700 | 390 | 56 | Excellent. |
| 125 | 890 | 510 | 64 | Do. |
| 148 | 850 | 525 | 62 | Do. |

TABLE III

Coating Thickness: 8 pounds per ream.
Conditioning: 0 percent Relative Humidity, 74° Fahrenheit, 48 Hours

| Drying Temperature (° centigrade) | $V_1$ | $V_2$ | Percent Retained | Print Quality |
|---|---|---|---|---|
| Room Temperature | 1,450 | 750 | 52 | Excellent. |
| 60 | 1,400 | 720 | 51 | Do. |
| 100 | 1,750 | 1,075 | 62 | Do. |
| 125 | 1,600 | 900 | 56 | Do. |
| 148 | 1,700 | 900 | 53 | Do. |

TABLE IV

Drying Temperature, Room Temperature.
Conditioning: 40 to 50 percent Relative Humidity, 70 to 75° Fahrenheit for 96 Hours

| Coating Thickness (pounds per ream) | $V_1$ | $V_2$ | Percent Retained | Print Quality |
|---|---|---|---|---|
| 11 | 1,250 | 600 | 48 | Excellent. |
| 10 | 1,100 | 450 | 41 | Do. |
| 8 | 850 | 310 | 36 | Do. |
| 5 | 850 | 340 | 40 | Do. |
| 3 | 800 | 400 | 50 | Do. |
| 1.5 | 550 | 260 | 47 | Do. |
| 2 | 550 | 230 | 42 | Do. |
| 1.5 | 400 | 150 | 38 | Good. |

EXAMPLES 2–11

Additional graft copolymer latices were prepared in the same manner as described in Example 1. Each was coated on paper at a coating thickness of from 8 to 10 pounds per ream. The coatings were dried at room temperature and the coated papers were conditioned at 49 percent relative humidity, 71° Fahrenheit for 96 hours. Each paper was then charged in the manner described in Example 1, and direct image reproductions were made also as described in Example 1. The composition of the respective graft copolymers and the results of the charging tests and printing tests for each are shown in Table V.

TABLE V

| Example Number | Composition of Graft Copolymer | | | Accepted Voltage, $V_1$ | Retained Voltage, $V_2$ | Percent Retention | Print Quality |
|---|---|---|---|---|---|---|---|
| | Vinyl Chloride | Styrene | Butadiene | | | | |
| 2 | 50 | 30 | 20 | 680 | 480 | 71 | Excellent. |
| 3 | 50 | 20 | 30 | 750 | 300 | 40 | Do. |
| 4 | 50 | 10 | 40 | 310 | 100 | 32 | Fair. |
| 5 | 50 | 40 | 10 | 400 | 290 | 72 | Excellent. |
| 6 | 60 | 10 | 30 | 550 | 150 | 27 | Do. |
| 7 | 60 | 20 | 20 | 680 | 440 | 65 | Do. |
| 8 | 60 | 30 | 10 | 450 | 250 | 55 | Do. |
| 9 | 65 | 17.5 | 17.5 | 500 | 340 | 68 | Do. |
| 10 | 70 | 10 | 20 | 500 | 320 | 64 | Do. |
| 11 | 70 | 20 | 10 | 400 | 240 | 60 | Do. |

EXAMPLES 12–15

In the following examples the graft copolymer substrates were vinyl chloride copolymers prepared in the same manner as described in Example 1 using a polymerization time of 24 hours and the following polymerization recipe:

| | | |
|---|---|---|
| Vinyl chloride | grams | 58.5 |
| Water | do | 78.0 |
| Ammonium hydroxide (28 percent) | cc | 0.5 |
| Potassium persulfate | gram | 0.1 |
| Sodium lauryl sulfate | do | 0.1 |
| Capric acid | do | 0.9 |
| Ethylenically unsaturated comonomer | grams | 6.5 |

Graft copolymers of the above copolymer substrates and styrene-butadiene grafting mixtures were then prepared in the manner described in Example 1. The comonomers used in preparing the substrates and the composition of the final graft copolymers are shown in Table VI.

TABLE VI

| Ex. No. | Comonomer in substrate | Graft Copolymer Weight Percent of— | | |
|---|---|---|---|---|
| | | Substrate | Styrene | Butadiene |
| 12 | Methyl methacrylate | 65 | 10 | 25 |
| 13 | Ethyl acrylate | 65 | 10 | 25 |
| 14 | Vinylidene chloride | 63 | 12 | 25 |
| 15 | Dibutyl maleate | 61 | 14 | 25 |

Each of the above graft copolymer latices was coated onto paper in the same manner as described in Example 1 to provide a coating thickness of from 6 to 8 pounds per ream. The coated papers were dried at room temperature, subjected to various conditionings and then tested to determine ability to accept and retain electrostatic charges in the manner previously described in Example 1. Results are summarized in Table VII, where $V_1$ and $V_2$ represent accepted charge and retained charge, respectively.

TABLE VII

| Latex from Example | | Conditioning | | |
|---|---|---|---|---|
| | | Same as in Table I | As in Table III for 24 hours | As in Table II for 24 hours |
| 12 | $V_1$ | 900 | 1,100 | 600 |
| | $V_2$ | 350 | 350 | 300 |
| | Percent Retained | 39 | 32 | 50 |
| 13 | $V_1$ | 1,000 | 1,150 | 650 |
| | $V_2$ | 375 | 450 | 300 |
| | Percent Retained | 38 | 39 | 46 |
| 14 | $V_1$ | 800 | 1,250 | 650 |
| | $V_2$ | 300 | 460 | 300 |
| | Percent Retained | 37 | 37 | 46 |
| 15 | $V_1$ | 1,000 | 1,450 | 600 |
| | $V_2$ | 425 | 750 | 275 |
| | Percent Retained | 43 | 52 | 46 |

Excellent print quality was obtained in each case when direct image reproductions were made from each of the conditioned coated papers in the manner described in Example 1.

EXAMPLES 16–30

Each of the graft copolymer latices of Examples 1 through 15 was used in the preparation of a xerographic binder plate.

The photoconductive material used in the xerographic plates was pigment grade zinc oxide sold under the trade name "Photox 801" by the New Jersey Zinc Co. 175 grams of the zinc oxide were weighed into a jar with 70 grams of water in which 1.5 grams of an anionic dispersant (tradename "Tamol 731") had been previously dissolved. Four ¾ inch flintstones were added to the jar and the jar was rolled at 100 revolutions per minute for one hour. At this point, sufficient amounts of the latex used were added to the jar to give a pigment to resin solids weight ratio of about 3.5. Water was added in an amount sufficient to provide a total solids content of 55 to 58 percent by weight. Milling was continued for an additional half hour.

Each of the resulting slurries contained about 12.8 weight percent polymer solids from the latex, thus providing about 22.2 weight percent of graft copolymer in the dry film. Each mixture was coated on paper commercially sold under the tradename "Fotolith" by the S. D. Warren Co. using an air knife coater. The coating weight in each instance was about 22 pounds per ream. The respective coatings were air dried at room temperature and then briefly heated at 150° centigrade for 2 to 3 minutes. Each of the coated papers was then in a dark room having a relative humidity of about 50 percent.

The conditioned photoconductive papers were then charged using a corona discharge device for testing in the xerographic process described, for example, in Carlson U.S. Patent 2,297,691. Development of the electrostatic images was accomplished in the usual manner. Images developed on each of the paper base binder plates (prepared as described above) were at least as good as images developed on zinc oxide coated paper made from solutions of silicone resin in a toluene-xylene solvent mixture.

Excellent binder plates are also prepared from latices as described above substituting other photoconductive materials such as zinc sulfide, tetragonal lead monoxide, etc., for the zinc oxide.

What is claimed is:

1. A latex of a graft copolymer of (I) a polymeric substrate material selected from the group consisting of homopolymers of vinyl chloride and copolymers thereof with up to 20 percent by weight, based on the total weight of other ethylenically unsaturated compounds copolymerizable therewith, and (II) a mixture of (a) butadiene and (b) styrene, the weight ratio of the polymeric substrate (I) to the mixture (II) being from about 1.0 to about 2.33 and the weight ratio of (a) butadiene to (b) styrene in the mixture (II) being from about 0.25 to about 4.0, said latex containing from about 1 to about 10 percent, based on the weight of graft copolymer, of a mechanical stabilizing agent selected from members of the group consisting of shellac solubilized in water with ammonia and shellac solubilized in water with borax, the pH of the solution being adjusted to from about 6.5 to about 8.3.

2. Latex of claim 1 wherein the polymeric substrate is vinyl chloride homopolymer.

3. Latex of claim 1 wherein the mechanical stabilizing agent is shellac.

4. Latex of claim 2 wherein the weight ratio of (I) to (II) is about 1.85, the weight ratio of (a) to (b) is about 1.0, and the mechanical stabilizing agent is about 5 percent by weight of shellac, based on the weight of the graft copolymer.

5. Process which comprises (a) polymerizing a monomeric material (I) selected from the group consisting of vinyl chloride and mixtures thereof with up to about 20 percent by weight, based on the total weight, of other ethylenically unsaturated monomers copolymerizable therewith at a temperature of from about 0° to about 100° centigrade in water containing a free radical polymerization catalyst and a surfactant, said surfactant consisting essentially of a mixture of (A) fatty acid salt and (B) salt of a member of the group consisting of alkyl sulfates, alkyl aryl sulfonates and mixtures thereof; the alkyl groups of each of said salts (A) and (B) containing from 8 to 18 carbon atoms; each of said salts (A) and (B) being selected from the group consisting of alkali metal, ammonium and water-soluble amine salts; the total weight of said surfactant mixtures, calculated on the basis of the weight of the fatty acid from which the fatty acid salt is derived and the weight of the salt (B), being within the range of from about 0.5 percent to about 2.0 percent by weight of said monomeric material; the respective proportions of said fatty acid and said salt (B) being sufficient to maintain a stable emulsion of the polymerization product; (b) adding to the latex thus produced a mixture (II) of (a) butadiene and (b) styrene, and from 1 to 10 percent by weight, based on the sum of the weights of said polymerized monomeric material, said butadiene and said styrene, of a member of the group consisting of shellac solubilized in water with ammonia and shellac solubilized in water with borax, the pH of the solution being adjusted to from about 6.5 to about 8.3; (c) maintaining the temperature of the reaction mass at 40° to 100° centigrade to polymerize the resulting mixture, the weight ratio of the monomeric material (I) to the mixture (II) being from about 1.0 to about 2.33 and the weight ratio of (a) butadiene to (b) styrene in said mixture being from about 0.25 to about 4.0.

6. Process of claim 5 wherein said monomeric material (I) is vinyl chloride.

7. Process of claim 5 wherein said mechanical stabilizing agent is shellac.

8. Process of claim 5 wherein the catalyst used for polymerizing the monomeric material (I) is the sole polymerization catalyst used in polymerizing the resulting mixture, said monomeric material (I) is vinyl chloride, said mechanical stabilizing agent is shellac, the weight ratio of monomeric material (I) to the mixture (II) is about 1.85, and the weight ratio of (a) butadiene to (b) styrene in the mixture is about 1.0.

References Cited
UNITED STATES PATENTS

| | | | |
|---|---|---|---|
| 2,996,469 | 8/1961 | Cole et al. | 260—879 |
| 3,167,598 | 1/1965 | Heaps | 260—876 |
| 3,240,843 | 3/1966 | Nelson | 260—879 |

OTHER REFERENCES

Skeist, I.: "Handbook of Adhesives," Reinhold Publishing Co., New York, 1962, TP 986 S5C.2 (p. 434 relied on).

DONALD E. CZAJA, Primary Examiner.

W. E. PARKER, Assistant Examiner.

PO-1050
(5/69)

UNITED STATES PATENT OFFICE
CERTIFICATE OF CORRECTION

Patent No. 3,409,575          Dated November 5, 1968

Inventor(s) Albert J. Cole and Floyd L. Edris

It is certified that error appears in the above-identified patent and that said Letters Patent are hereby corrected as shown below:

Column 5, line 25, "described above" should read --above described--;

Column 6, line 18 "thickened" should read --thickness--;

Column 8, line 9 "890" should read --800--;

Column 8, line 24, "Condltioning" should read --Conditioning-

SIGNED AND
SEALED

SEP 2 - 1969

(SEAL)
Attest:

Edward M. Fletcher, Jr.
Attesting Officer

WILLIAM E. SCHUYLER, J
Commissioner of Patent